(12) United States Patent
Dietz

(10) Patent No.: US 8,512,571 B2
(45) Date of Patent: Aug. 20, 2013

(54) TREATMENT OF IRON CONTAMINATED LIQUIDS WITH AN ACTIVATED IRON SOLIDS (AIS) PROCESS

(76) Inventor: Jonathan M. Dietz, State College, PA (US)

( * ) Notice: Subject to any disclaimer, the term of this patent is extended or adjusted under 35 U.S.C. 154(b) by 840 days.

(21) Appl. No.: 12/283,525

(22) Filed: Sep. 12, 2008

(65) Prior Publication Data

US 2009/0084733 A1    Apr. 2, 2009

Related U.S. Application Data

(63) Continuation-in-part of application No. 11/211,260, filed on Nov. 2, 2005, now abandoned.

(51) Int. Cl.
*B01D 21/00*    (2006.01)

(52) U.S. Cl.
USPC .......... 210/722; 210/726; 210/738; 210/96.1; 210/143; 210/199

(58) Field of Classification Search
USPC ......................................................... 210/709
See application file for complete search history.

(56) References Cited

U.S. PATENT DOCUMENTS

| | | | | |
|---|---|---|---|---|
| 4,224,148 | A | * | 9/1980 | Lindman et al. ............. 210/714 |
| 5,505,857 | A | | 4/1996 | Misra et al. |
| 5,601,704 | A | * | 2/1997 | Salem et al. ................... 210/86 |
| 5,954,969 | A | * | 9/1999 | Hedin ........................... 210/709 |
| 6,214,237 | B1 | * | 4/2001 | Kustra et al. ................. 210/709 |
| 6,344,143 | B1 | | 2/2002 | Ahn et al. |
| 6,660,163 | B2 | | 12/2003 | Miklos |
| 6,773,593 | B2 | | 8/2004 | Young |
| 2003/0222028 | A1 | * | 12/2003 | Dietz ........................... 210/722 |
| 2006/0032821 | A1 | * | 2/2006 | Dietz ........................... 210/722 |

OTHER PUBLICATIONS

Hedin, R. S. et al., "Passive Treatment of Acid Mine Drainage with Limestone", J. Environ. Qual., vol. 23, pp. 1338-1345, Nov.-Dec. 1994.
Dietz, J.M., "Abiotic Heterogeneous Ferrous Iron Oxidation in Mine Drainage: Modeling and Treatment Processes", A Thesis in Environmental Engineering Submitted in Partial Fulfillment of the Requirements for the Degree of Doctor of Philosophy, Department of Civil & Environmental Engineering, Aug. 2003, The Pennsylvania State University, University Park, PA.

(Continued)

*Primary Examiner* — Tony G Soohoo
*Assistant Examiner* — Peter Keyworth
(74) *Attorney, Agent, or Firm* — Debra M. Parrish, P.C.

(57) ABSTRACT

The present invention is a method and system for treating iron-contaminated water (e.g., mine drainage) using an innovative treatment approach identified herein as the Activated Iron Solids (AIS) Process. The AIS process is capable of oxidizing and removing iron as iron oxides from iron-contaminated waters (such as, mining-related discharge, groundwater, surface water and industrial waste streams) producing a clean effluent. The AIS process is performed in a single or multiple tank system in which high concentrations of AIS are suspended through mechanical mixing to maintain a catalytic surface chemistry environment that increases iron removal thousands times faster than would naturally occur and hundreds times faster than existing arts (e.g., aerobic pond passive treatment). The AIS process can utilize inexpensive alkaline material (such as, pulverized limestone) where initial mine drainage alkalinity (mg/L as $CaCO_3$) to ferrous iron (mg/L) ratio is less than approximately 1.7. Excess accumulated activated iron solids are periodically removed from the system using a waste-activated iron solids (WAIS) system and directed to an iron oxide thickener for further concentration.

12 Claims, 2 Drawing Sheets

Plan View of Treatment System to Oxidize and Remove Ferrous Iron From Iron Contaminated Mine Water

(56) References Cited

OTHER PUBLICATIONS

Tamura, H. et al. "Effect of Anions on the Oxygenation of Ferrous Ion in Neutral Solutions", Journal of Inorganic and Nuclear Chemistry, vol. 38, pp. 113-17, 1976.

Dietz, J. M. And Dempsey, B. A., "Treatment of Mine Drainage Using Recirculated Iron Oxides in a Complete Mix Reactor", presented at the 2001 National Association of Abandoned Mine Lands Annual Conference, Aug. 19-22, 2001, Athens, Ohio.

Dempsey, B.A., & Jeon, B-H. "Characteristics of Sludge Produced from Passive Treatment of Mine Drainage" Geochemistry: Exploration, Environment, Analysis, vol. 2, 2001, pp. 1-6, 1467-7873/01/$15.00c2001, AEG/Geological Society, London.

Tamura, H., Goto, K. And Nagayama, M., "The Effect of Ferric Hydroxide on the Oxygenation of Ferrous Ions in Neutral Solutions", Corrosion Science, 1976, vol. 16, pp. 197-207, Pergamon Press, Printed in Great Britain.

Chou, L., Garrels, R. and Wollast, R., "Comparative study of the kinetics and mechanisms of dissolution of carbonate minerals", Chemical Geology, 78 (1989) 269-282, Elsevier Science Publishers B.V., Amsterdam, printed in The Netherlands.

Pearson, F. and McDonnell, A., "Use of Crushed Limestone to Neutralize Acid Wastes", Journal of the Environmental Engineering Division, Feb., 1975, pp. 139-158.

Hedin, R. and Watzlaf, G., "The Effects of Anoxic Limestone Drains on Mine Water Chemistry", presented at International Land Reclamation & Mine Drainage Conference and Third International Conference on Abatement of Acidic Drainage, Pittsburgh, PA, Apr. 24-29, 1994, pp. 185-194.

Millero, F., Sotolongo, S. and Izaguirre, M., "The Oxidation Kinetics of Fe(II) in Seawater", Geochimica et Cosmochimica Acta, vol. 51, pp. 793-801, Pergamon Journals Ltd. 1987.

Hedin, R.S., & Nairn, R.W. 1993. Containment Removal Capabilities of Wetlands Constructed to Treat Coal Mine Drainage. p. 187-195. In G.A. Moshiri (ed.), Constructed Wetlands for Water Quality Improvements. Lewis Publishers, Boca Raton, Florida, USA.

Stumm, W. & Morgan, J.J. 1996. Acquatic Chemistry, 3rd Ed. (pp. 683-691), John Wiley & Sons, Inc., New York, USA.

Office Action for U.S. Appl. No. 11/211,260 dated Nov. 16, 2006.
Office Action for U.S. Appl. No. 11/211,260 dated Jul. 31, 2007.
Office Action for U.S. Appl. No. 11/211,260 dated Mar. 12, 2008.
Office Action for U.S. Appl. No. 10/453,127 dated Nov. 19, 2004.
Office Action for U.S. Appl. No. 10/453,127 dated Mar. 29, 2005.
Office Action for U.S. Appl. No. 10/453,127 dated Apr. 12, 2006.
Office Action for U.S. Appl. No. 10/453,127 dated Nov. 16, 2006.

\* cited by examiner

TREATMENT OF IRON CONTAMINATED LIQUIDS WITH AN ACTIVATED IRON SOLIDS (AIS) PROCESS

RELATED APPLICATIONS

This patent application is a continuation-in-part of pending patent application Ser. No. 11/211,260, filed on Nov. 2, 2005, itself a continuation-in-part of patent application Ser. No. 10/453,127, filed on Jun. 3, 2003, now abandoned, the latter having claimed priority from provisional patent application Ser. No. 60/384,680, filed on Jun. 3, 2002 and entitled "A Process and Device for Treating Iron Contaminated Liquids", all of which are incorporated by reference herein.

BACKGROUND OF THE INVENTION

1. Field of the Invention

This invention relates generally to a device and method for and the treatment of iron-contaminated fluid (e.g., mining-related discharge, groundwater, surface water and industrial waste streams) and, more particularly, to an apparatus and method for oxidizing and removing ferrous iron from iron-contaminated fluid, including mine drainage, and producing an effluent substantially free of iron.

2. Description of the Prior Art

Iron-contaminated water results from a variety of natural and anthropogenic processes with the latter typically involving mining and industrial processing. Ferrous iron is released from minerals (e.g., pyrite, siderite, and hematite) through dissolution and redox processes. Industrial processing typically involves formation of reduced iron ($Fe^0$) into various metallic compounds, with waste streams or subsequent oxidation causing elevated ferrous iron levels.

The most common source of iron-contaminated water results from mineral extraction and can be produced from either surface or deep mining practices where iron sulfide minerals contained in the minerals and surrounding formations are oxidized. The chemistry of mine drainage will vary depending on overburden characteristics and mining and reclamation techniques. In the United States millions of gallons of mine drainage is produced daily from both active and abandoned mine sites. Treating mine drainage is an expensive endeavor involving land, construction, materials, operation, maintenance and chemical costs. Left untreated, mine drainage contaminate surface and groundwater causing impacts to their social, recreational and commercial uses.

Iron is removed from iron-contaminated waters employing chemical and passive treatment technologies. Current chemical treatment, more commonly used for industrial sources and active mines, requires continuous metering of caustic chemicals (e.g., quick lime, hydrated lime or soda ash) to raise the pH above 8 thereby increasing the rate of iron oxidation and precipitation as oxides (USEPA 1981). In addition to chemical additives, active treatment requires an assorted array of pumps, aeration equipment and multiple oxidation and settling basins. Iron oxide solids produced in chemical treatment are low density (1 to 4% solids) and highly contaminated with calcium, aluminum, manganese, and sodium deposits (Dempsey & Jeon 2001). The low-density solids slowly settle in large open water basins, which require frequent and costly maintenance to remove and dispose the accumulated solids.

Passive treatment systems rely on natural amelioration processes that do not require pumps or metered chemical additions. In general, mine drainage passes through open water ponds and/or aerobic wetlands where abiotic and biotic processes contribute to the oxidation and precipitation of iron (Hedin & Nairn 1993). Iron removal in passive treatment systems require much larger land areas (10 to 20 times greater) than chemical treatment, which can become excessive for high flow and/or high iron concentration mine drainage discharges. In addition, iron removal in passive systems can be problematic with performance varying with season, influent flow and iron concentration, and alkalinity in the mine drainage. Iron oxide solids produced by passive treatment systems have much higher sludge density (15-30%) than chemical treatment and are frequently less contaminated (Dempsey & Jeon, 2001). Reported iron oxide content in passive treatment solids varies from 50 to 90%.

AIS-treated waters produce a unique iron oxide sludge that (1) settles at a rate faster than either chemically or passively produced solids; (2) is a high-density sludge with solids of approximately 30%; and (3) is a high-purity sludge with iron oxide content exceeding 95%. The prior art does not address the unique solids content of AIS-treated fluids.

Ferrous iron oxidation is usually the limiting step in the iron removal from iron-contaminated mine drainage. Iron oxidation has been described to occur by two separate processes known as homogeneous oxidation, a solution oxidation process, and heterogeneous oxidation, a solid/solution interface oxidation process. Homogeneous oxidation involves soluble $Fe^{2+}$, $FeOH^+$, or $Fe(OH)_2^\circ$ species in the presence of dissolved oxygen (Stumm & Morgan 1996). This oxidation is strongly dependent on pH with slow oxidation occurring at pH 6 and rapid oxidation occurring above pH 8. Heterogeneous oxidation involves sorbed ferrous iron on the surface of iron oxides in which the iron oxide acts as a catalyst (Dietz 2003 and Tamura & Nagayama 1976). At high suspended iron oxide concentrations, heterogeneous oxidation has been found to produce oxidation rates greater than 100 times the rates observed in passive treatment and comparable rates to chemical treatment (Dietz 2003, and Dietz & Dempsey 2001)). Heterogeneous ferrous iron oxidation (HeFIO) is described by the following model:

$$\frac{\partial [Fe(II)]}{\partial t} = -\left(k_{He1} \times [DO] \times \frac{1 + ([Fe(II)_{diss}] \times K_1^{app})}{[\equiv Fe(III)] \times \Gamma_1 \times \{H^+\}^1}\right) -$$

$$\left(k_{He2} \times [DO] \times \frac{1 + ([Fe(II)_{diss}] \times K_2^{app})}{[\equiv Fe(III)] \times \Gamma_2 \times \{H^+\}^2}\right)$$

$$pK_{x,T2}^{app} = pK_{x,T1}^{app} - \left(\frac{\Delta H_{rxn,x}^0}{2.303 \times R} \times \frac{T_2 - T_1}{T_2 \times T_1}\right)$$

$$pk_{Hex,T2} = pk_{Hex,T1} - \left(\frac{E_{a,x}}{2.303 \times R} \times \frac{T_2 - T_1}{T_2 \times T_1}\right)$$

Summary of parameters and constants in the ferrous iron sorption heterogeneous ferrous iron oxidation (HetOX) models.

| Model Parameter | Description | Sub-Model (x = 1) | Sub-Model (x = 2) |
|---|---|---|---|
| [Fe(II)] | Ferrous Iron Concentration, molar | varies | Varies |
| ∂[Fe(II)]/∂t | Ferrous Iron Oxidation Rate | varies | varies |
| [DO] | Dissolved Oxygen Concentration, molar | varies | varies |
| [Fe(II)]$_{diss}$ | Dissolved Fraction of Ferrous Iron, molar | varies | varies |
| [≡Fe(III)] | Suspended AIS as Ferric Iron Concentration, g/L | varies | varies |

-continued

Summary of parameters and constants in the ferrous iron sorption heterogeneous ferrous iron oxidation (HetOX) models.

| Model Parameter | Description | Sub-Model (x = 1) | Sub-Model (x = 2) |
|---|---|---|---|
| $\{H^+\}$ | Hydrogen Ion Activity, molar $\{H^+\} = 10^{-pH}$ | varies | varies |
| $k_{Hex}$ (M$^{-1}$s$^{-1}$) | Oxidation Rate Constant | 0.105 | 38.0 |
| $E_{a,x}$ (kJ/mol) | Activation Energy of Oxidation Reaction | 60.7 | 60.7 |
| $K_x^{app}$ (M$^{x-1}$) | Surface Complexation Constant | $10^{-1.265}$ | $10^{-10.78}$ |
| $\Gamma_x$ (mol/mol) | Sorption Site Density | 0.0045 | 0.212 |
| $\Delta H^0_{rxn,x}$ (kJ/mol) | Enthalpy of Sorption Reaction | 69.0 | 96.2 |
| $\{H^+\}$ Coefficient (x) | Hydrogen Ion Coefficient | 1 | 2 |

Homogeneous oxidation is by far the dominant process in both chemical and passive treatment, typically accounting for greater than 95% of the oxidation. This occurs because (1) chemical treatment occurs at high pH were homogeneous oxidation is by far the fastest oxidation either with or without suspended iron oxide solids; and (2) passive treatment is a non-mechanical approach that does not allow for the suspension of high concentrations of iron oxide (>200 mg/L) that would be needed to have heterogeneous oxidation dominate ferrous iron oxidation.

Alkalinity may need to be generated to complete the precipitation of oxidized ferrous iron where the source water alkalinity (mg/L as $CaCO_3$) to iron (mg/L as Fe) ratio is less than about 1.7. The low pH (approximately 5 to 6) and/or high carbonic acid concentrations ($P_{CO2}$ approximately 0.1 to 0.5) found in many iron-contaminated waters (i.e., mine drainage) results in the rapid dissolution of carbonate minerals (such as calcite), thereby producing alkalinity at concentrations higher than will typically occur in natural systems. A type of passive treatment, known as Anoxic Limestone Drains (ALD), has been found to produce alkalinity greater than 300 mg/L (Hedin et al 1994). Other research has found carbonate dissolution occurs rapidly until pH greater than 6 is achieved and the rate of dissolution is directly proportional to the surface area of the carbonate mineral present (Amrhein et al 1985; Pearson & McDonnell 1974). Testing done with a relatively unused material, pulverized limestone, in AIS treatment has been shown to adequately address the alkalinity issue due to rapid dissolution of the carbonate in the high ferrous oxidation reaction rate environment of AIS in combination with the complete mixing in the AIS reactor.

Therefore, it is an object of this invention to provide treatment processes and apparatus for oxidizing and removing ferrous iron from iron-contaminated mine waters at pH (less than 7) typically found in iron-contaminated waters.

Another object of this invention is to oxidize and remove ferrous iron from iron-contaminated waters by using the higher oxidation rates supported by heterogeneous oxidation through mechanical suspension of high particulate iron oxide concentrations (i.e., >200 mg/L) and providing a source of alkalinity where inadequate alkalinity is present to complete the oxidation and precipitation of iron.

It is also an object of this invention to develop a simple means of collecting and concentrating the iron oxides produced by the iron-contaminated liquid treatment processes and apparatuses.

Other objects will be readily apparent after reading the description and reviewing the figures described below.

SUMMARY OF THE INVENTION

The invention involves an apparatus consisting of a single tank or multiple tank assembly (in series or parallel), each tank constructed of steel, reinforced concrete, or plastic and containing: (i) mechanical aeration (e.g., Gardner Denver/Sutorbilt positive displacement blower, electric motor providing air to fine or coarse bubble diffusers) and/or (ii) mixing apparatus (e.g., Lightnin Mixers with shafts and impellers) for maintaining oxygenated water and a suspension of high concentrations of particulate iron oxides (>200 mg/L). For a sequencing batch reactor (SBR) apparatus, the tank assembly would also contain storage capacity in the bottom of said tank for activated iron solids (AIS). This invention also involves a method of concentrating iron oxides in the reactor through settling, time and/or flow-based process controls (e.g., Nemar, Inc. Automation Systems and Controls), and a waste activated iron solids (WAIS) apparatus (e.g., Goulds submersible pump). For a flow through reactor (FTR) apparatus, the tank assembly would include a flocculator/clarifier (e.g., WESCO lamella clarifier) to collect and store activated iron solids (AIS) and a return/waste activated iron solids (RAIS & WAIS) apparatus (e.g., Seepex Inc. Sludge pump) with flow-based process controls (e.g., Nemar, Inc. Automation Systems and Controls).

The invention also includes: apparatus (e.g., Kraus vibratory doser) to add alkaline material (such as, pulverized calcite limestone) directly to the tank assembly when additional alkalinity is needed to complete the ferrous iron oxidation and precipitation reactions; and a separate container assembly to thicken iron oxides produced by the treatment process. The invention has the capacity to discharge substantially iron free water with circumneutral pH.

The following description will provide a complete understanding of the invention when reviewed in connection with the accompanying drawing figures.

DESCRIPTION OF PREFERRED EMBODIMENTS

As used herein, the term "heterogeneous reaction" is defined as a reaction involving two or more phases, i.e., solid, liquid and/or gas. In the case of heterogeneous iron oxidation, the reaction involves a ferrous iron solution and an iron oxide solid where ferrous iron is sorbed from the solution and oxidized on iron oxide at the solid/solution interface. See, Sung, W. and J. J. Morgan, "Kinetics and product of ferrous iron oxygenation in aqueous systems", *Environ. Sci. & Tech.* 14(5): 561-567 (1980).

Figure 1:
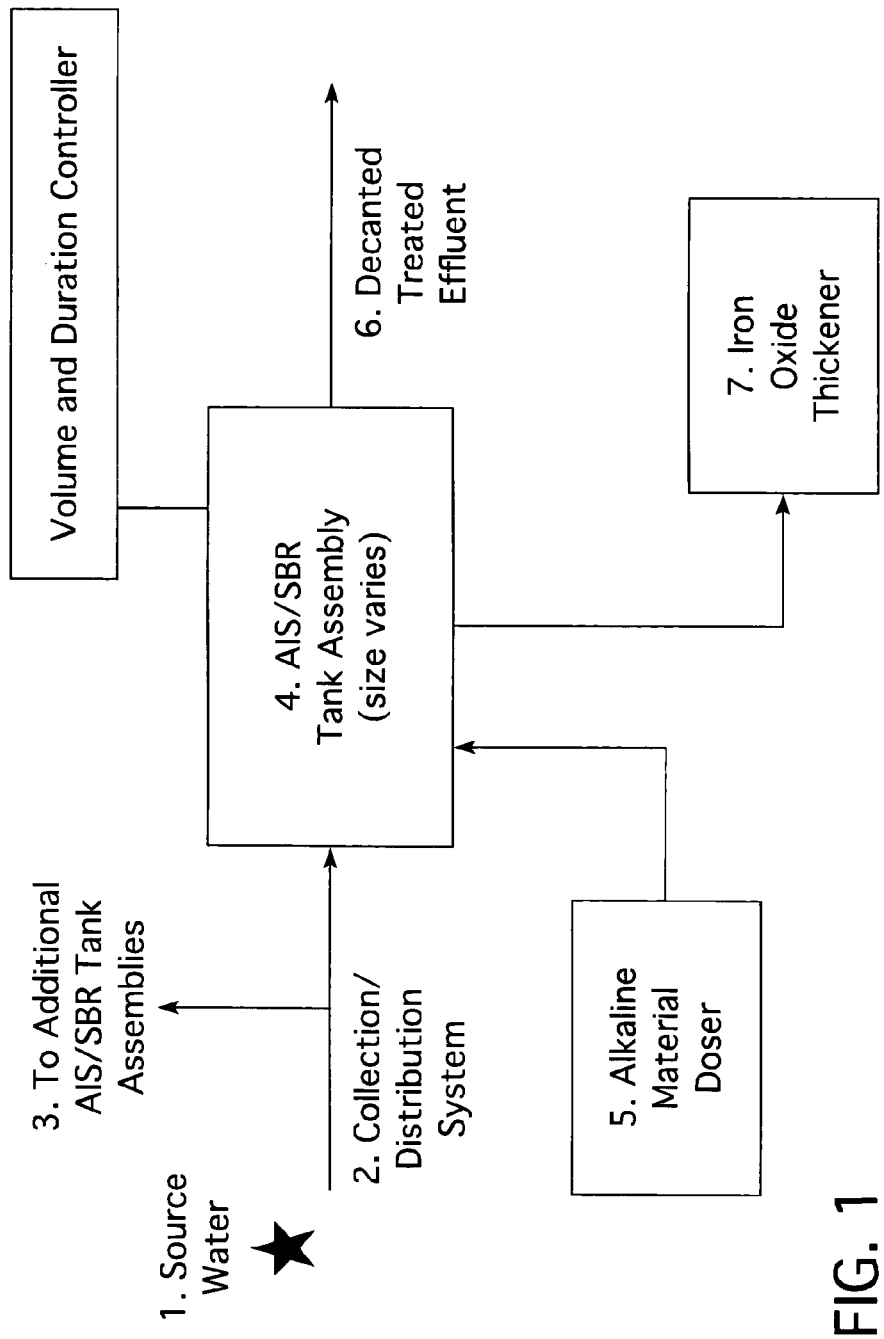
FIG. 1 is a schematic plan view of a preferred treatment system for oxidizing and removing ferrous iron from a flow of iron-contaminated mine water.

FIG. 1 is a plan view of the treatment system. An iron-contaminated water source (1) is directed into a least one AIS tank assembly (4) or more preferably a plurality of AIS container assemblies. The means of directing the iron-contaminated water into at least one AIS tank assembly may be by gravitational force or by pumping the iron-contaminated liquid into the AIS tank assembly. When a plurality of AIS container assemblies are used in the treatment of iron-contaminated water, a means for collecting and distributing the iron-contaminated water, such as a header system or distribution tank assembly, precedes the AIS tank assembly (3).

Figure 2:
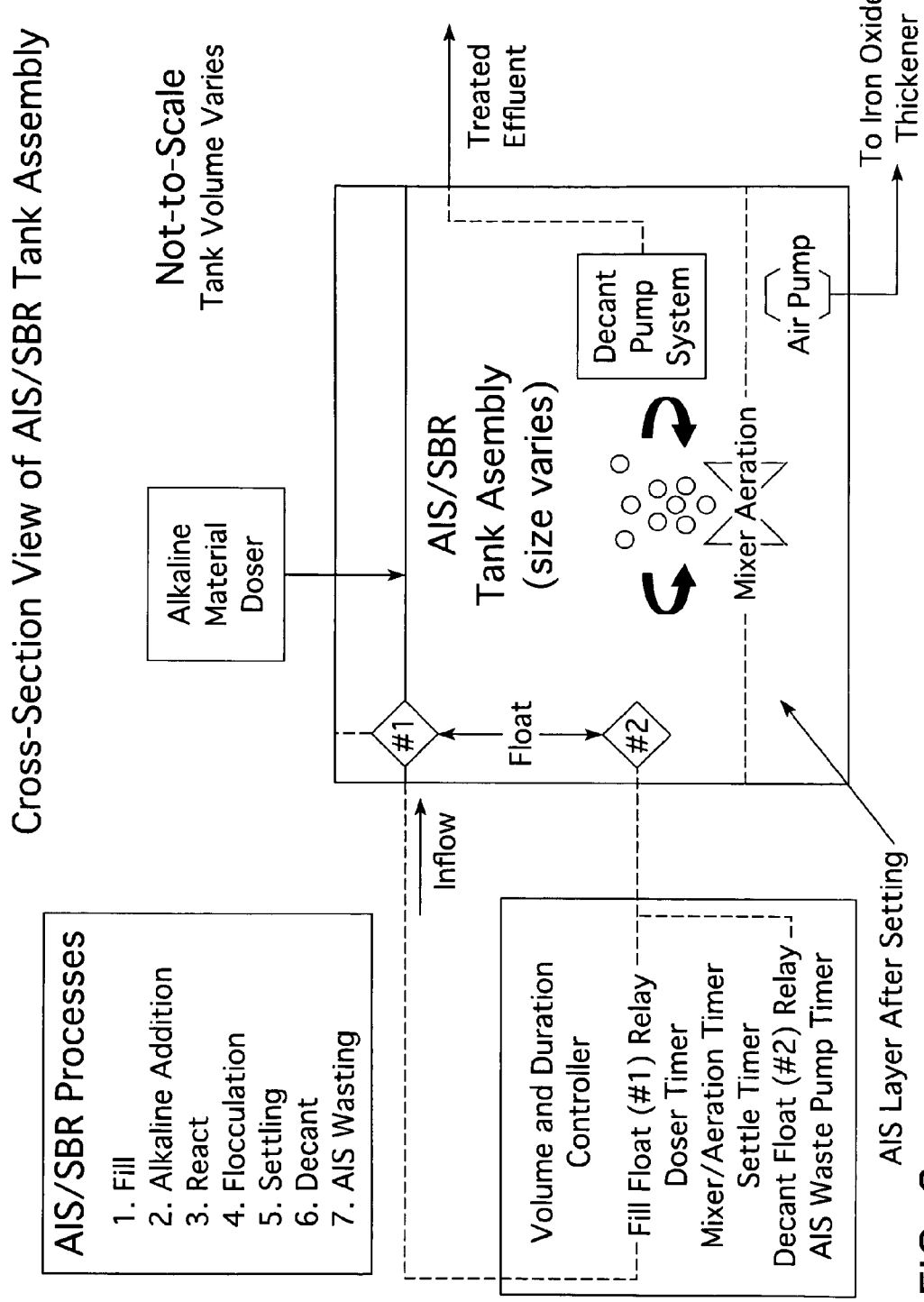
FIG. 2 is a schematic cross-sectional view of a preferred embodiment of sequencing batch reactor (SBR) tank assembly.

The source of iron-contaminated fluid is directed through a first conduit (2) that is engaged with the inlet of the AIS tank assembly (4) or a plurality of AIS container assemblies. Each AIS tank assembly in a plurality of AIS tank assemblies is identical as shown in FIG. 2, a cross-section view of said AIS container assembly. FIG. 2 is a sequencing batch reactor (SBR) tank assembly where all processes (fill, aeration/mixing, flocculation, settling, AIS retention, decant, and AIS wasting) occur sequentially within one (1) tank assembly. A flow-through tank assembly (not shown) has (1) at least two completely stirred reactors (CSTR) in series; (2) a clarification tank assembly following the CSTR to collect AIS; and (3) a system in the clarifier to re-circulate and waste AIS.

A system of the present invention has the following features:
1) A means for directing the fluid to be treated into a tank assembly having the features described herein;
2) A means of aeration (e.g., Gardner Denver/Sutorbilt positive displacement blower, electric motor providing air to fine or coarse bubble diffusers) and mixing (e.g., Lightnin Mixers with shafts and impellers) within the tank assembly to provide sufficient oxygen for ferrous iron oxidation, carbon dioxide removal for optimal pH operation, and suspension of the activated iron solids (AIS) in the tank assembly at iron oxide concentrations greater than 200 mg/L;
3) A means of storing or re-circulating AIS within the tank assembly to maintain sufficiently high reactor iron oxide concentrations (>200 mg/L) to catalyze ferrous iron oxidation by the heterogeneous oxidation process;
4) A means of decanting or overflow from the tank assembly to remove treated iron-contaminated fluid;
5) A means to remove excess iron oxides from the tank assembly; and
6) A means of controlling the duration of the various container assembly processes such as fill, reaction, flocculation, settling and decant. Such means include any of the commercially available means (e.g., the Tork adjustable cycle timer, the Tyco Time Delay Relays, the Ametek National Controls Corporation Multi-range Delay on Break or the Grasslin Timemaster GMX Series 24 hr 7 day cycle timer).

One representative system employed a Control Panel made and sold by Purestream, Inc., with Timers made and sold by Crouzet, a company of Schneider Electric connected thereto. Included in the SBR Tank assembly were two representative Floats, Float #1 made and sold by Conery Manufacturing Inc. and Float #2 made and sold by Conery Manufacturing, Inc. The Decant Pump System employed therewith was Model No. 3888D3, made and sold by Goulds Pumps, ITT Corporation.

The control panel employed in one representative system assists in treatment by process control involving the timers and floats operating electrical relays in the control panel to turn on and off mechanical blowers, mixers and pumps. During the heterogeneous ferrous iron reaction cycle, the timers and relays turn on blowers and mixers to provide aeration and suspension of iron oxide solids with the reaction cycle determined based on the duration required to achieve the required ferrous iron oxidation. It is the suspension and re-suspension of elevated iron oxide solid concentrations through mechanical means that causes heterogeneous ferrous iron oxidation and distinguishes this invention from the homogeneous system patented by Hedin.

After the reaction cycle, the timers turn off the blowers and mixers resulting in a quiescent period to allow the iron oxides solid suspension to settle to the bottom of the container where the solids are stored for subsequent reaction cycles or wasted to prevent excess accumulation of iron oxide solids. Excess iron oxide solids are removed from the container using a timer operated waste pump. After the required settling time, a timer turns on a floating decant pump to remove the ferrous iron treated and iron oxide settled water. The decant pump removes treated water to a preset water level as established by the float switch and at a level that does not remove settled iron oxide solids stored in the bottom of the container. Once this preset water level is met, the float switch turns off the decant pump. This same float switch also turns on a fill pump or opens a valve to refill the container with untreated water to a preset water level as established by a float switch. The float switch engages the reaction timers (blowers and mixers) initiating a new treatment cycle. The treatment process is continuously operated by the control panel.

The method of the present invention includes the following steps:
1) Directing a fluid to be treated into a tank assembly having the features described herein;
2) Aerating and mixing iron-contaminated fluid within a container assembly to provide sufficient oxygen for ferrous iron oxidation, carbon dioxide removal, and suspension of the activated iron solids (AIS) in solution;
3) Storing or re-circulating AIS within the container assembly to maintain sufficiently high reactor iron oxide concentrations to catalyze ferrous iron oxidation;
4) Decanting the container assembly to remove treated iron-contaminated fluid;
5) Removing excess iron oxides from the container assembly; and
6) Controlling the duration of the various container assembly processes such as fill, reaction, flocculation, settling and decant to optimize the process and desired output characteristics. Commercially available timers and controls are described above.

The method may also include a plurality of container assemblies operated with an inlet header and a means for selectively isolating the flow to selected container assemblies. Processing steps in the AIS/SBR Container assembly are described below:

Fill Step. Iron-contaminated fluid enters at least one AIS/SBR tank assembly. Preferably, for an efficient process, the tank is filled to capacity with such iron-contaminated fluid. In some preferred embodiments the iron-contaminated fluid is mixed, aerated or both during the fill step. The temporal duration of the fill step may vary depending on fluid flow rate and characteristics, tank volume and the chemistry of the iron-contaminated fluid. Almost any commercially available timer and control may be used in this step.

Alkaline Addition Optional Step. Alkaline material optionally may be added to an AIS/SBR tank assembly after or during the fill step preferably using a doser assembly (5 on FIG. 1). The amount of alkaline material added to the iron-contaminated fluid in the AIS/SBR tank assembly may vary depending on the chemistry of the iron-contaminated fluid and the amount of alkalinity needed to complete iron precipitation.

React Step. Oxidation and precipitation occurs in an AIS/SBR tank assembly during the react step. In addition, in cases in which alkaline material is added, the dissolution of the material and the generation of alkalinity occur in conjunction with the oxidation and precipitation of iron. Iron oxides retained in the AIS/SBR Tank Assembly are suspended in fluid providing a surface for heterogeneous ferrous iron oxidation. Iron oxides in suspension during the react step for mine drainage typically range from approximately 200 up to 5,000 mg/L as iron and depend on the chemistry of the iron-contaminated fluid and the mixed fluid in the AIS/SBR tank assembly during the react step. Precipitation of ferric iron produced from the oxidation of ferrous iron is rapid and requires much less time than the ferrous iron oxidation. React durations will vary depending on iron-contaminated fluid ferrous iron concentration, the volume of iron-contaminated fluid to be treated, pH, dissolved oxygen and alkalinity. When the iron-contaminated fluid is mine drainage and standard AIS/SBR tank assemblies are used, the duration of the react period is generally less than two hours.

Flocculation Optional Step. AIS and new iron oxides formed during the react step may benefit from an optional flocculation step to create larger iron oxide particles that settle more readily and easily. The optional flocculation step involves: (i) adding a flocculant (e.g., anionic acrylamide polymer); and (ii) slow mixing to provide a fluid velocity in the reactor equal to or less than 0.001 ft/sec in an AIS/SBR tank assembly for enabling iron oxide particle interaction and agglomeration. Flocculation durations vary depending on the desired output and characteristics of the fluid and particles after the react step. When treating iron-contaminated mine drainage in standard AIS/SBR tank assemblies, this step may last as long as one-half hour in duration.

Settle Step. Iron oxides are removed from suspension in the AIS/SBR tank assembly by substantially ceasing and mixing or aeration treatment of the iron-contaminated fluid. The substantially quiescent conditions in the AIS/SBR Tank Assembly permit AIS and newly formed iron oxides to settle and accumulate in the bottom of an AIS/SBR tank assembly. Settle step durations vary depending on the AIS concentration in the AIS/SBR tank assembly and desired purity of the resulting fluid. When treating iron-contaminated mine drainage in standard AIS/SBR assemblies, this step generally is less than two hours in duration.

Decant Step. Subsequent to the settle step, treated fluid in an AIS/SBR tank assembly is removed from the tank assembly during the decant step. The decant step involves the removal, preferably rapid removal, of substantially clarified supernatant fluid that overlies fluid containing settled AIS. Typically, less than 75% of the fluid in the tank is decanted although both the volume and time of the decant step will vary depending on the desired characteristics of the decanted fluid, the volume of the tank and the rapidity and thoroughness of the settling step. In a preferred embodiment for treating iron-contaminated water, the decant period to remove 75% of the volume of the fluid in the tank wherein the tank is a standard volume, the mine drainage has standard characteristics, the time for the decant step generally is less than one-half hour.

AIS Wasting Step. Excess AIS that results from newly formed iron oxides, is periodically removed from the AIS/SBR tank assembly in a step known as AIS wasting. AIS wasting may occur during any of the above steps and optionally can be conducted during a plurality of steps. The duration, volume of AIS removed, purity of AIS removed and frequency of this step will vary depending on the characteristics of the iron contaminated fluid to be treated, the application and duration of the other steps, the use of optional steps, and the desired characteristics of effluent.

Steps in the process when using a two-stage flow-through AIS tank assembly comprise:
1) Inflow step. Iron-contaminated fluid enters the AIS tank assembly, preferably on a continuous basis.
2) An optional Alkaline addition step. Alkaline material optionally is added to the first reactor in the two-stage flow-through AIS tank assembly, preferably on a continuous basis (5 on FIG. 1). The amount of alkaline material applied varies depending on the characteristics of the chemistry of the iron-contaminated fluid and the amount of alkalinity needed to complete the iron precipitation.
3) Oxidation and precipitation Step. Oxidation and precipitation occurs in the first and second reactors (Stage 1 and Stage 2). Iron oxides re-circulated to the first reactor are suspended through aeration and mixing to provide a surface for the heterogeneous ferrous iron oxidation. This high iron oxide concentration preferably is maintained by flow-through in the second reactor. Iron oxides in suspension in the first and second reactors may be in the range from approximately 200 up to 5,000 mg/L as iron depending on the chemistry of the iron-contaminated fluid and the mixed fluid in the first and second reactors. Precipitation of ferric iron produced from the oxidation of ferrous iron is rapid and requires much less time than the ferrous iron oxidation. First reactor and second reactor volumes and detention times vary depending on iron-contaminated fluid flow, ferrous iron concentration, pH, dissolved oxygen and alkalinity, but usually comprise less than two hours of detention time.
4) Solids removal Step. AIS and new iron oxides formed in the first and second reactors are removed and collected in the flocculation/clarification tank assembly. The flocculation step involves adding a flocculent (e.g., anionic acrylamide polymer) and slow mixing to provide a fluid velocity in the reactor equal to or less than 0.001 ft/sec to enable iron oxide particle interaction and agglomeration. Flocculation durations vary depending on the desired output and characteristics of the fluid and particles after the react step. When treating iron-contaminated mine drainage in standard flow-through tank assembly, this step may last as long as one-half hour. The flocculated iron oxide solids are removed and collected in a clarifier where the solids result in a collection of highly concentrated iron oxides ranging from 10,000 to 60,000 mg/L and overflow essentially iron free water. The highly concentrated layer of iron oxide continues the oxidation and precipitation of iron and can be employed as a stand-alone unit. The size of the clarifier depends on the flow and chemical characteristics of the water being treated, but is approximately in the range of 500 to 2,000 gallons per day for every square foot of clarifier surface area.
5) AIS recirculation and wasting Step. AIS collected in the clarifier is continuously removed and re-circulated to the first reactor using a solids pump system, or a combination thereof. Excess AIS, a result of newly formed iron oxides, are periodically or continuously removed from the tank assembly using this recirculation system, but diverting the AIS to a holding tank or thickener.

In an embodiment of the present invention that employs this method and system, the AIS tank assembly or plurality of AIS Container assemblies is connected to an outlet conduit (step 6 in FIG. 1) into which treated fluid is discharged from the AIS container assembly. The outlet discharges optionally into a receiving waterbody or an additional treatment system. Decant fluid or effluent from the AIS Container assembly will have pH greater than 6 and iron concentrations of 5 mg/L or less depending on the effluent criteria or treatment goals.

The method and system according to the present invention optionally includes an additional method of and system for thickening iron oxides produced by the foregoing method and system. An iron oxide thickening system comprises:
1) A means of conveying fluids containing iron oxides to a container;

2) A container in which fluids containing iron oxides are retained to provide additional settling time, slow mixing of the fluid to increase solids, or both;
3) A means of removing concentrated iron oxide solids from the container; and
4) A means of decanting supernatant substantially free of iron solids from the container.

Iron oxide thickening steps of the method of the present invention include:
1) Conveying fluids containing iron oxides to a container;
2) Retaining a fluid containing iron oxides in a container for sufficient time for iron oxides to concentrate in the fluid by removal of water accomplished by providing additional settling time, slow mixing of the fluid containing iron oxide to increase the removal of water, or to both settle and mix such fluids;
3) Removing concentrated iron oxide solids from the container; and
4) Decanting a supernatant substantially free of iron solids from the container.

In an embodiment of the present invention that employs this method and system, waste activated iron solids (WAIS), the excess AIS produced by an iron oxidation treatment method or system according to the present invention, is directed into a tank. Such fluid can be directed into the tank by using a variety of means including pumps, gravitational force, a combination of both, or other means. See, step 7 in FIG. 1. The tank and thickening step decreases the fluid content of the iron oxide solids and thereby increases the solid content of the iron oxide solids. The iron oxide thickener tank system consists of a tank assembly containing a supernatant decant pump and a solid recovery pump. The tank assembly may also provide a means for mixing the fluid to aid in removing excess water from the iron oxide solids. Iron oxides resulting from such a step and system typically have a solid content up to 40%. Solids recovered from such processes and systems have commercial reuse potential.

It will be understood from the above description that the present invention is related to a new device and treatment process for iron-contaminated water, such as mine drainage. This process and device may decrease the treatment area or volume or construction costs compared to passive treatment approaches; and decrease treatment costs compared to conventional chemical treatment through the elimination of the use of costly chemicals (e.g., lime and polymers) or their replacement with lower cost chemicals (e.g. pulverized limestone). The process may prove to be an economical alternative to both current passive treatment and chemical treatment approaches. The process has the added benefit of producing a relatively pure and easier to recover iron oxide solid that may have commercial value.

Although preferred embodiments of the invention have been described in detail herein, it will be appreciated by those skilled in the art that various modifications and alternatives to the preferred embodiments may be developed in light of the overall teaching of the disclosure. Accordingly, the particular arrangements are illustrative only and are not limiting as to the scope of the invention, which is to be given full breadth of the amended claims and any and all equivalents thereof.

What is claimed is:

1. A system for removing ferrous iron from an iron-contaminated fluid comprises: a. At least one first tank for receiving the fluid wherein said first tank is constructed of a material selected from the group consisting of steel, concrete and plastic, said tank having at least one means of ingress and egress of fluid; b. means of transporting the fluid into said first tank; c. means of aerating and mixing the fluid in said first tank to suspend activated iron solids at concentrations in excess of 200 mg/L as iron thereby creating a catalytic oxidation environment dominated by a heterogeneous ferrous iron oxidation process; d. means of decanting substantially iron-free supernatant fluid from said first container without disturbing settled iron oxides; and e. means of controlling the volume and temporal duration of fluids transported in and out of said first container, aerating and mixing the fluid in said first tank, and maintaining the fluid in a quiescent state in the first tank, wherein said means for controlling provides aeration and suspension of iron oxide solids during a heterogeneous ferrous iron oxidation process reaction cycle, and said quiescent state to allow then activated iron solids to settle and be stored for subsequent reaction cycles, to maintain said concentrations.

2. A system according to claim 1 having a plurality of first tanks.

3. A system according to claim 2 further comprising: means for selectively directing flow of the fluid to at least one of said first tanks.

4. A system according to claim 1 further comprising: a. means for conveying fluid from the first tank into a second tank; b. means of mixing fluids in the second tank to suspend activated iron solids at concentrations greater than 200 mg/L as iron thereby creating a catalytic oxidation environment dominated by a heterogeneous ferrous iron oxidation process; c. means of removing excess iron oxides from the second tank; and d. means of decanting a substantially iron-free supernatant fluid from the second tank.

5. A system according to claim 1 further comprising: means for delivering into the first tank an alkaline-bearing material selected from the group consisting of a powdered limestone, a quick lime, a hydrated lime and a caustic soda.

6. A system according to claim 5 further comprising: a. means for conveying fluid from the first tank into a second tank; b. means of mixing fluids in the second tank to suspend activated iron solids at concentrations greater than 200 mg/L as iron thereby creating a catalytic oxidation environment dominated by the heterogeneous ferrous iron oxidation process; c. means of removing iron oxides from the second tank; and d. means of decanting a substantially iron-free supernatant fluid from the second tank.

7. A heterogeneous ferrous iron oxidation system for the sorption of ferrous iron from a fluid to a suspended iron solid and subsequent oxidation of the iron oxide solid, said system comprising: a. At least one first tank for receiving iron-contaminated fluid wherein the first tank has at least one means of ingress and egress of fluid; b. means of transporting iron-contaminated fluid into the first tank; c. means of aerating and mixing iron-contaminated fluid within the first tank to suspend activated iron solids at concentrations in excess of 200 mg/L as iron thereby creating a catalytic oxidation environment dominated by a heterogeneous ferrous iron oxidation process; d. means of decanting substantially iron-free supernatant fluid from the first tank without disturbing settled iron oxides; and e. means of controlling the volume and temporal duration of transporting fluids in and out of the first tank, aerating and mixing a fluid within the first tank, and maintaining a fluid in a quiescent state in the first tank, wherein said means for controlling provides aeration and suspension of iron oxide solids during a heterogeneous ferrous iron oxidation process reaction cycle, and said quiescent state to allow the activated iron solids to settle and be stored for subsequent reaction cycles, to maintain said concentrations.

8. A system according to claim 7 having a plurality of first tanks.

9. A system according to claim 8 further comprising means for selectively directing the flow of a fluid to at least one of said first tanks.

10. A system according to claim 7 further comprising means for delivering alkaline-bearing material into the first tank.

11. A system according to claim 7 further comprising: a. means for conveying fluid from the first tank into a second tank; b. means of mixing fluids in the second tank; c. means of removing iron oxides from the second tank; and d. means of decanting a substantially iron-free supernatant fluid from the second tank.

12. A system according to claim 10 further comprising: a. means for conveying fluid from the first tank into a second tank; b. means of mixing fluids in the second tank; c. means of removing iron oxides from the second tank; and d. means of decanting a substantially iron-free supernatant fluid from the second tank.

* * * * *